United States Patent
Allen (10) Patent No.: US 12,323,895 B2
(45) Date of Patent: Jun. 3, 2025

(54) GEOSPATIAL PHYSICAL LOCATION FOR EMERGENCY SERVICES CALLS USING VOICE OVER INTERNET PROTOCOL OR MULTI-LINE TELEPHONE SYSTEM

(71) Applicant: 911 Inform LLC, Wall Township, NJ (US)

(72) Inventor: Ivo Allen, Freehold, NJ (US)

(73) Assignee: 911 Inform LLC, Wall Township, NJ (US)

( * ) Notice: Subject to any disclaimer, the term of this patent is extended or adjusted under 35 U.S.C. 154(b) by 429 days.

(21) Appl. No.: 18/080,526

(22) Filed: Dec. 13, 2022

(65) Prior Publication Data

US 2023/0199461 A1 Jun. 22, 2023

Related U.S. Application Data

(60) Provisional application No. 63/291,671, filed on Dec. 20, 2021, provisional application No. 63/291,705, filed on Dec. 20, 2021.

(51) Int. Cl.
| | | |
|---|---|---|
| H04W 4/90 | (2018.01) | |
| H04N 7/18 | (2006.01) | |
| H04W 4/021 | (2018.01) | |
| H04W 4/029 | (2018.01) | |

(52) U.S. Cl.
CPC ............. *H04W 4/90* (2018.02); *H04N 7/181* (2013.01); *H04W 4/021* (2013.01); *H04W 4/029* (2018.02)

(58) Field of Classification Search
CPC ....... H04W 4/90; H04W 4/029; H04W 4/021; H04N 7/181
See application file for complete search history.

(56) References Cited

U.S. PATENT DOCUMENTS

| | | | | |
|---|---|---|---|---|
| 6,243,442 | B1* | 6/2001 | Tanaka | H04M 3/42314 379/50 |
| 7,420,963 | B1* | 9/2008 | Shankar | H04L 12/66 370/352 |
| 2006/0282302 | A1* | 12/2006 | Hussain | G06Q 10/06 705/2 |
| 2009/0291663 | A1* | 11/2009 | Schultz | H04M 3/465 455/404.2 |
| 2018/0199179 | A1 | 7/2018 | Rauner | |
| 2019/0082477 | A1* | 3/2019 | Burton | F16M 13/022 |
| 2023/0199462 | A1 | 6/2023 | Allen | |

OTHER PUBLICATIONS

Non-Final Office Action in U.S. Appl. No. 18/080,538 dated Mar. 27, 2025.

* cited by examiner

*Primary Examiner* — Dai Phuong
(74) *Attorney, Agent, or Firm* — Morse, Barnes-Brown & Pendleton, P.C.; Sean D. Detweiler, Esq.

(57) ABSTRACT

A method and apparatus for providing an enhanced geospatial physical location for emergency services calls originating from one or more phone extensions using voice over internet protocol (VoIP) or MLTS multi-line telephone system. The system and method detect when a phone extension has been added or moved and queries the user associated with the extension to obtain the current physical location of the extension. The obtained location data is maintained in a database which can then be queried or otherwise consulted to provide an enhanced geospatial physical location for an emergency services call from the phone extension.

42 Claims, 9 Drawing Sheets

GEOSPATIAL PHYSICAL LOCATION FOR EMERGENCY SERVICES CALLS USING VOICE OVER INTERNET PROTOCOL OR MULTI-LINE TELEPHONE SYSTEM

CROSS-REFERENCE TO RELATED APPLICATION(S)

This application claims priority to, and the benefit of, U.S. Provisional Application No. 63/291,671, filed Dec. 20, 2021, and U.S. Provisional Application No. 63/291,705, filed Dec. 20, 2021, for all subject matter contained in said applications. The disclosures of said provisional applications are hereby incorporated by reference in their entirety.

FIELD OF THE INVENTION

The present invention relates to methods and systems for providing an enhanced geospatial physical location for emergency services calls, such as 911 calls in North America. In particular, the present invention is directed to providing an enhanced geospatial physical location for emergency services calls originating from one or more phone extensions (which in this context can be taken to include actual extensions, device ID, user ID, or a combination thereof) using voice over internet protocol (VoIP) or MLTS multi-line telephone system.

BACKGROUND

In today's evolving enterprise environments, user mobility is everything. Remote workers are easily enabled, and communications can now take place from almost anywhere, and on any device. With that, employees working from home have become the new normal. As an example, a user who has a wired phone at the office may also work remotely via their laptop and softphone. That user is now active in two separate locations, where both are using the same phone number and extension. This Multiple Device Access (MDA) capability creates a specific emergency services (such as 9-1-1) location challenge that administrators must deal with to remain compliant with new Federal laws, such as Kari's Law and the Ray Baum's Act § 506.

Public Safety Answering Points (PSAPs) are the local emergency services call centers that receive 9-1-1 emergency calls occurring within a specific geographic area. Across the US, these geographic areas can be defined in a multitude of different ways, all depending on their location. 80% of the 7000 centers are small agencies, serving a single city, or a single coverage area as large as a state (see Rhode Island). As Enterprise users can now work from both home and the office, they could (and will likely) cross the invisible boundaries of one PSAP to another without anyone being aware. In a scenario where a user has logged into a remote device or softphone at home and has not updated their location information, an emergency services call (such as a 9-1-1 call) would be routed to the PSAP that covers their work location, delaying response times.

For the past 20 years, existing solutions have attempted to solve the mobility/location dilemma by tracking the movement of devices. These solutions attempt to tie a device to a specific location and unique phone number. The solutions also assume that the device will not move unless an administrator it is updated with the location information. The two main techniques employed are Layer 2 discovery and Layer 3 discovery under the Open Systems Interconnection (OSI) model.

Tracking the location of VoIP phones to the desktop is accomplished by using the Layer 2 discovery method. With Layer 2 discovery, the connection to the physical data switch port is achieved, but the location reported is the physical switch port in the communications closet of a building or venue, and not the location of the wall jack where the phone is located. To obtain that actual jack information, detailed cable records must be maintained of each patch cord in the data closet; and exactly to which jack each switch port is connected. Should a cable be moved, the accompanying cable record must then be manually updated with the new information. If the cable records are out of date, the associated location information will mislead internal and first responders which will delay a response. While this method can provide very accurate location information, it requires a dedicated amount of manual intervention to accurately manage the cable plant records. In addition to these arduous record-keeping requirements, unique DID (Direct Inward Dialing) numbers must also be assigned to each location and tracked, associating them to an emergency services (e.g., 9-1-1) location record.

An alternative method of tracking the movement of VoIP phones is to associate MLTS phones with specific subnet ranges within a building. This is commonly referred to as Layer 3 discovery under the OSI model. This simply means that a network utilizes multiple subnets, or IP address ranges, and associates each range to a specific physical area. These Emergency Response Locations (ERLs) or "zones" of a building, designate the general area of the emergency. As phones register, their IP Address ties them to a specific subnet ERL. Each ERL is provisioned with the appropriate location and identification used by Public Safety to respond. This method works well, and in most cases maintains itself, however, issues can arise if the physical area of a subnet gets stretched beyond the defined zone. For example, if a cable from one subnet is connecting to a user located in a different subnet area, the logic is broken, and the incorrect information is then relayed to first responders. Plus being "zone" based, the granularity of reporting is to an area, not a specific location. While this method is very easily maintained, the granularity is compromised.

Figure 1:
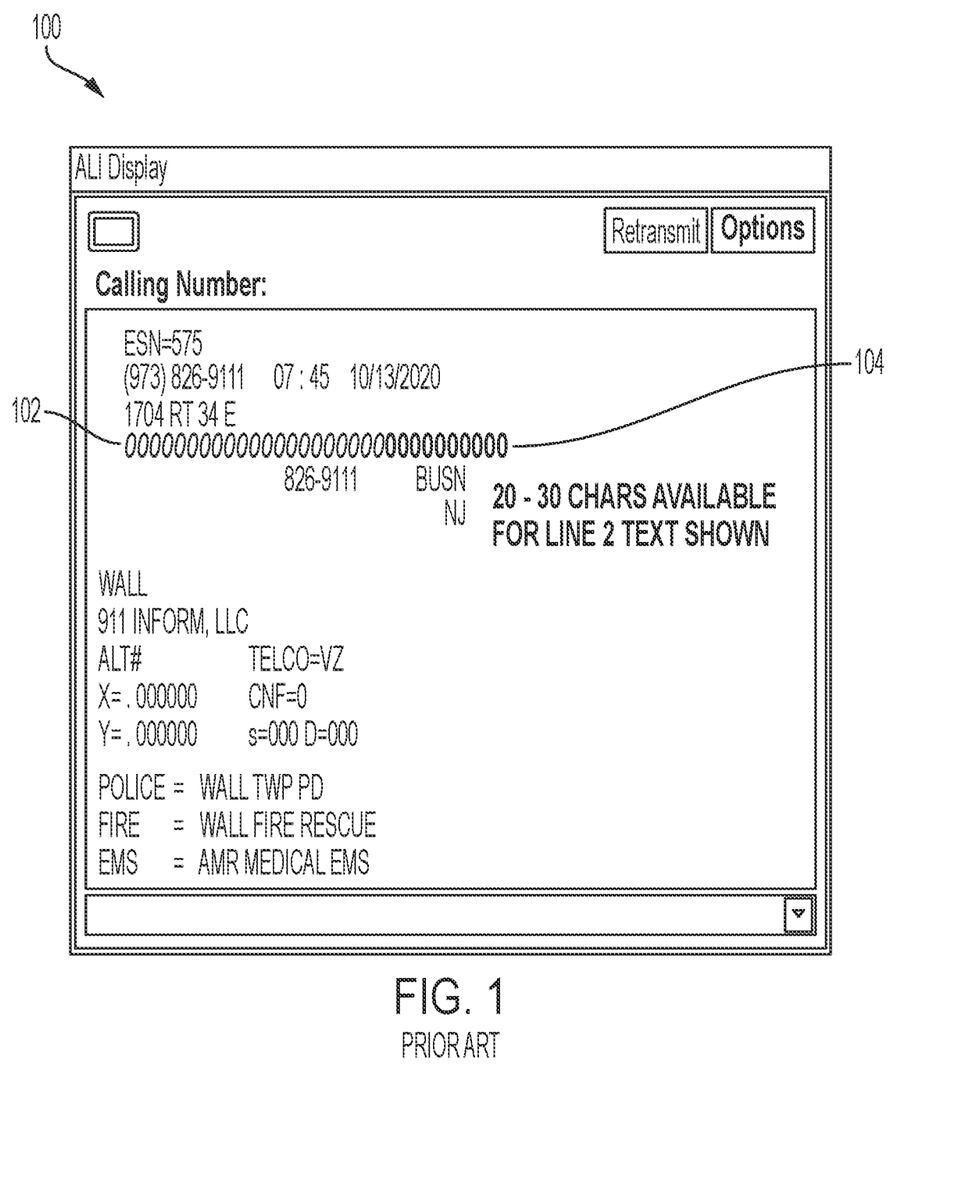
FIG. 1 is an example of a data screen provided by conventional emergency services call processing.

E911 (Enhanced 911) is the 911 network functionality available today for emergency services calls in North America. E911 provides 2 basic lines of location information to the PSAP as seen in the example data screen 100 of FIG. 1. The first is the Line 1 data 102 and consists of the basic address associated with the specific phone number. The secondary Line 2 information 104 is the data a first responder can use to identify a specific location beyond the basic address, allowing them to locate the emergency. Line 2 data 104 is limited to 20 ASCII characters of information and is the information that can be updated when IP phones move location. In many cases, these updates can take anywhere from 24-48 hours to go live in the PSAP.

The inefficiency of conventional emergency services call handling to provide dynamic location updates, complete and useful location information, and account for an increasing number of remote workers, is creating an environment more dangerous and requiring new solutions.

SUMMARY

There is a need for a system and method to efficiently track and update phone extension locations s update and provide an accurate and useful location for emergency services and first responders. The present invention is directed toward further solutions to address this need, in addition to having other desirable characteristics. Specifically, the system and method of the present invention detect when a phone extension has been added or moved and queries the user associated with the extension to obtain the current geospatial physical location of the extension. The obtained current geospatial physical location information is characterized and maintained in a database which can then be queried or otherwise consulted to provide the geospatial physical location for an emergency services call from the phone extension.

In accordance with example embodiments of the present invention, a system for providing an enhanced geospatial physical location for use by emergency services calls originating from one or more phone extensions using voice over internet protocol (VoIP) or MLTS multi-line telephone system is disclosed. The system includes an emergency call routing service, a client, and a geospatial location service provider.

The emergency call routing service is configured to receive, process, and route emergency calls. The client has one or more phone extensions. The geospatial location service provider is in communication with the emergency call routing service and the client. The geospatial location service is configured to maintain a location database for the one or more phone extensions, receive a request from the emergency call routing service for the enhanced geospatial physical location for an emergency services call from a phone extension stored in the maintained database, and output the enhanced geospatial physical location associated with the phone extension stored in the maintained database for the emergency services call in response to the request.

Maintaining the location database involves providing a database storing the one or more phone extensions wherein each phone extension is associated with the enhanced geospatial physical location and a user; detecting a phone extension registration event for a phone extension of the one or more phone extensions stored in the database; sending the user associated with the phone extension, for which the registration event was detected, a notification requesting geospatial location confirmation; receiving, in response to the sent notification, geospatial location confirmation from the user associated with the phone extension for which the registration event was detected; and updating the database with the enhanced geospatial physical location received in the geospatial location confirmation.

In accordance with aspects of the present invention, the one or more phone extensions of the maintained database comprise one or more phone extensions associated with a site. In some such aspects, the site comprises one or more of a company, organization, venue, building, campus, or facility. In some such aspects, the one or more phone extensions of the maintained database correspond to a physical phone jack/line. In certain aspects, the maintained database is remote from the site with which the one or more phone extensions are associated.

In accordance with aspects of the present invention, the enhanced geospatial physical location comprises one or more of: a country indication, a state indication, a street address, a floor designation, a room designation, and a floorplan indication.

In accordance with aspects of the present invention, the database further includes contact information (cell phone number, personal electronic device ID) for the user associated with each phone extension. In some such aspects, the contact information further includes an indication of a preferred contact method for the user.

In accordance with aspects of the present invention, detecting a phone extension registration event comprises detecting a connection of a phone associated with a phone extension of the one or more phone extensions stored in the database. In other aspects, detecting a phone extension registration event comprises detecting a change in a network/IP address associated with a phone extension of the one or more phone extensions stored in the database.

In accordance with aspects of the present invention, the notification is sent to the user via email. In other aspects, the notification is sent to the user via text message, additional electronic devices, or an application.

In accordance with aspects of the present invention, requesting geospatial location confirmation comprises asking the user for their current physical location. In other aspects, requesting geospatial location confirmation comprises providing enhanced geospatial location physical information based on location data obtained from sources other than the database, and requesting confirmation and/or clarification of provided geospatial location information. In some such aspects, the enhanced geospatial physical location information is the location data provided from a personal electronic device of the user associated with the phone extension for which the registration event was detected. In other such aspects, the enhanced geospatial physical location information is the location data provided by a network to which the phone extension, for which the registration event was detected, is connected.

In accordance with aspects of the present invention, providing the enhanced geospatial physical location further includes providing a map of the geospatial location.

In accordance with aspects of the present invention, outputting the enhanced geospatial physical location further comprises providing an altitude, where a positive altitude is above sea-level, and a negative altitude is below sea-level. In other aspects, outputting the enhanced geospatial physical location further comprises providing a room within a site where the phone extension for the emergency services call is located.

In accordance with aspects of the present invention, maintaining a location database, further comprises issuing a notification if a location confirmation is not received.

In accordance with example embodiments of the present invention, a system for providing an enhanced geospatial physical location for use by emergency services calls originating from one or more phone extensions using voice over internet protocol (VoIP) or MLTS multi-line telephone system is disclosed. The system includes a server configured to maintain a location database for the one or more phone extensions, receive a request for the enhanced geospatial physical location for an emergency services call from a phone extension stored in the maintained database, and output the enhanced geospatial physical location associated with the phone extension stored in the maintained database for the emergency services call in response to the request.

Maintaining the location database for the one or more phone extensions involves providing a database storing the one or more phone extensions wherein each phone extension is associated with the enhanced geospatial physical location and a user; detecting a phone extension registration event for a phone extension of the one or more phone extensions stored in the database; sending the user associated with the phone extension, for which the registration event was detected, a notification requesting geospatial location confirmation; receiving, in response to the sent notification, geospatial location confirmation from the user associated with the phone extension for which the registration event was detected; and updating the database with the enhanced geospatial physical location received in the geospatial location confirmation.

In accordance with example embodiments of the present invention, a system for providing an enhanced geospatial physical location for use by emergency services calls originating from one or more phone extensions using voice over internet protocol (VoIP) or MLTS multi-line telephone system is provided. The system includes an emergency call routing service and a geospatial location service. The emergency call routing service is configured to receive, process, and route emergency calls. The geospatial location service provider is in communication with the emergency call routing service and configured to maintain a location database for the one or more phone, receive a request from the emergency call routing service for the enhanced geospatial physical location for an emergency services call from a phone extension stored in the maintained database, and output the enhanced geospatial physical location associated with the phone extension stored in the maintained database for the emergency services call in response to the request.

Maintaining the location database for the one or more phone extensions includes providing a database storing the one or more phone extensions wherein each phone extension is associated with the enhanced geospatial physical location and a user; detecting a phone extension registration event for a phone extension of the one or more phone extensions stored in the database; sending the user associated with the phone extension, for which the registration event was detected, a notification requesting geospatial location confirmation; receiving, in response to the sent notification, geospatial location confirmation from the user associated with the phone extension for which the registration event was detected; and updating the database with the enhanced geospatial physical location received in the geospatial location confirmation.

In accordance with example embodiments of the present invention, a method of providing an enhanced geospatial physical location for use by emergency services calls originating from one or more phone extensions using voice over internet protocol (VoIP) or MLTS multi-line telephone system is disclosed. The method includes maintaining a location database for the one or more phone extensions, receiving a request for the enhanced geospatial physical location for an emergency services call from a phone extension stored in the maintained database, and outputting the enhanced geospatial physical location associated with the phone extension stored in the maintained database for the emergency services call in response to the request.

Maintaining the location database for the one or more phone extensions includes providing a database storing the one or more phone extensions wherein each phone extension is associated with the enhanced geospatial physical location and a user; detecting a phone extension registration event for a phone extension of the one or more phone extensions stored in the database; sending the user associated with the phone extension, for which the registration event was detected, a notification requesting geospatial location confirmation; receiving, in response to the sent notification, geospatial location confirmation from the user associated with the phone extension for which the registration event was detected; and updating the database with the enhanced geospatial physical location received in the geospatial location confirmation.

In accordance with aspects of the present invention, the one or more phone extensions of the maintained database comprise one or more phone extensions associated with a site. In some such aspects, the one or more phone extensions of the maintained database correspond to a physical phone jack/line at the site. In still other aspects, the maintained database is remote from the site with which the one or more phone extensions are associated.

In accordance with aspects of the present invention, the enhanced geospatial physical location comprises one or more of: a country indication, a state indication, a street address, a floor designation, a room designation, and a floorplan indication.

In accordance with aspects of the present invention, the database further includes contact information (cell phone number, personal electronic device ID) for the user associated with each phone extension. In some such aspects, the contact information further includes an indication of a preferred contact method for the user.

In accordance with aspects of the present invention, detecting a phone extension registration event comprises detecting a connection of a phone associated with a phone extension of the one or more phone extensions stored in the database. In other aspects, detecting a phone extension registration event comprises detecting a change in a network/IP address associated with for a phone extension of the one or more phone extensions stored in the database.

In accordance with aspects of the present invention, the notification is sent to the user via email. In other aspects, the notification is sent to the user via text message, an additional electronic device, or an application.

In accordance with aspects of the present invention, requesting geospatial location confirmation comprises asking the user for their current physical location. In other aspects, requesting geospatial location confirmation comprises providing enhanced geospatial location physical information based on location data obtained from sources other than the database and requesting confirmation and/or clarification of provided geospatial location information. In some such aspects, the enhanced geospatial physical location information is the location data provided from a personal electronic device of the user associated with the phone extension for which the registration event was detected. In other such aspects, the enhanced geospatial physical location information is the location data provided by a network to which the phone extension, for which the registration event was detected, is connected.

In accordance with aspects of the present invention, providing the enhanced geospatial physical location further includes providing a map of the geospatial location.

In accordance with aspects of the present invention, outputting the enhanced geospatial physical location further comprises providing an altitude, where a positive altitude is above sea-level, and a negative altitude is below sea-level. In still other aspects, outputting the enhanced geospatial physical location further comprises providing a room within the site that the phone extension for the emergency services call is located.

In accordance with aspects of the present invention, maintaining location database, further comprises issuing a notification if a location confirmation is not received.

In accordance with aspects of the present invention, the site comprises one or more of a company, organization, venue, building, campus, or facility.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to systems and methods for providing an enhanced geospatial physical location for emergency services calls (such as 9-1-1 calls in North America) originating from one or more phone extensions, device IDs, or user IDs using voice over internet protocol (VoIP) or MLTS multi-line telephone system. The system and method detect when a phone extension, device ID, or user ID has been added or moved and queries the user associated with the extension, device ID, or user ID to obtain the current location of the extension, device ID, or user ID. The obtained location data is maintained in a database which can then be queried or otherwise consulted to provide location data for an emergency services call from the phone extension, device ID, or user ID.

FIG. 2 through FIG. 9 wherein like parts are designated by like reference numerals throughout, illustrate an example embodiment or embodiments of the system and a methodology, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 2:
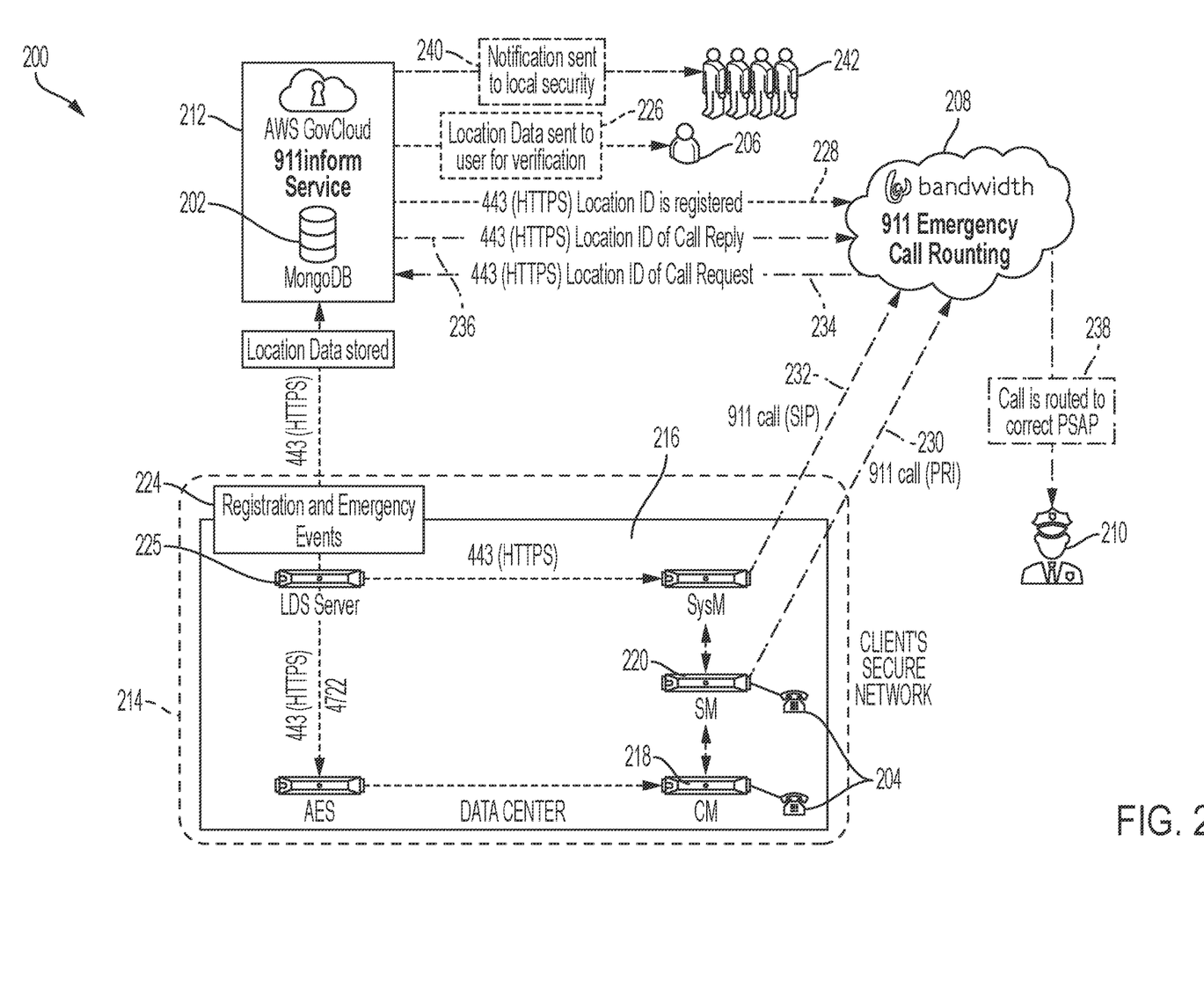
FIG. 2 is an example system for providing an enhanced geospatial physical location for emergency services calls originating from one or more phone extensions using voice over internet protocol (VoIP) or MLTS multi-line telephone system in accordance with embodiments of the present invention.

FIG. 2 depicts an example system 200 for implementing the present invention. The system 200 makes use of a location database 202 that stores one or more phone extensions, device ID, or user ID 204 wherein each phone extension, device ID, or user ID 204 is associated with a geospatial location and a user 206. The system also includes an emergency services call routing service 208 that receives incoming emergency services calls and provides the location data from the database 202 to an appropriate emergency responder 210.

In this embodiment, the location database is provided by a 911 geospatial location service provider 212. This service provider 212 can be located remotely or be cloud-based. In this embodiment, the one or more phone extensions, device IDs, or user IDs 204 are part of a multi-line telephone (MLTS) system located at client location. The client location may be a company, organization, venue, or other building, campus, facility, etc., herein collectively referred to as site 214, and includes equivalents that would be appreciated by those of skill in the art. The one or more extensions, device IDs, or user IDs 204 could be located in one or more offices, on one or more floors of the site 214. Here, the one or more phone extensions, device IDs, or user IDs 204 are connected to the data center 216 of the site 214. The one or more phone extensions, device IDs, or user IDs 204 can be connected either using a conventional phone jack or line connection with connectivity provided by a server 218 supporting Primary Rate Interface (PRI) communications or as a Voice over IP (VoIP) with connectivity provided via a server 220 providing Session Initiating Protocol (SIP) communication. It should be understood that these are mere examples of possible connectivity. Other configurations and connectivity will be apparent to one skilled in the art given the benefit of this disclosure and are considered to be equivalent.

Figure 3:
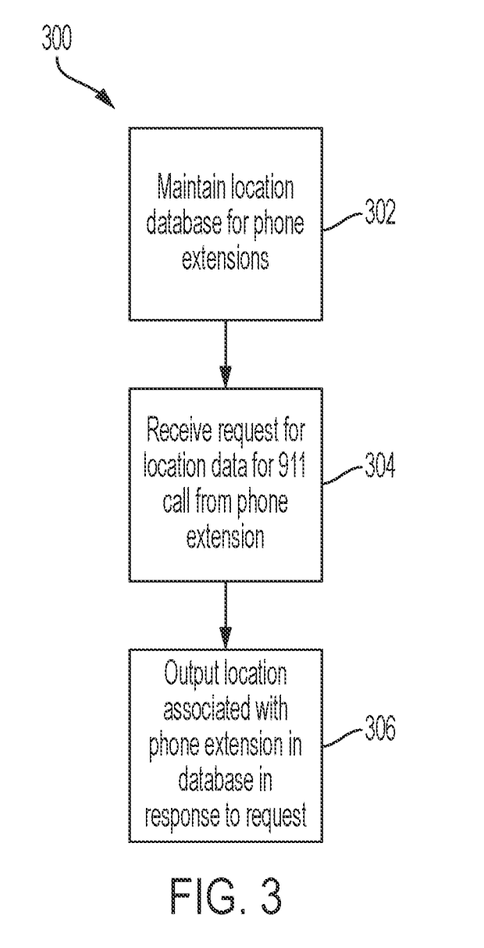
FIG. 3 is an example method for providing an enhanced geospatial physical location for emergency services calls originating from one or more phone extensions using voice over internet protocol (VoIP) or MLTS multi-line telephone system in accordance with embodiments of the present invention.
Figure 4:
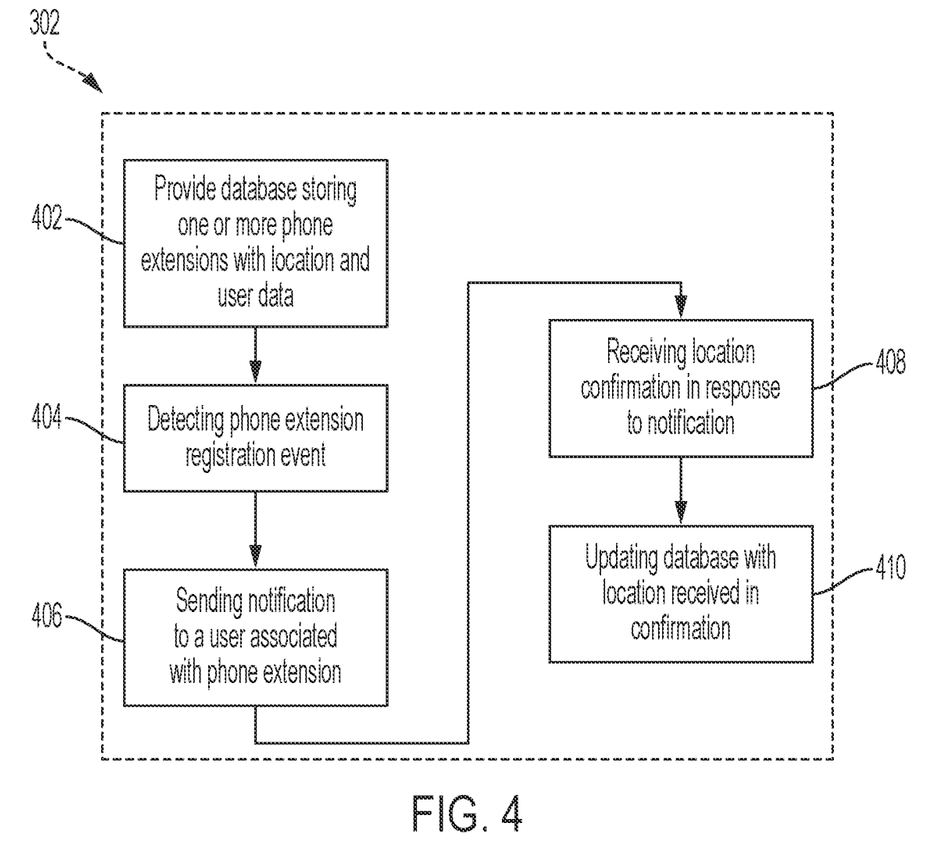
FIG. 4 is an example methodology for maintaining a location database as set forth in FIG. 3 in accordance with embodiments of the present invention.
Figure 5:
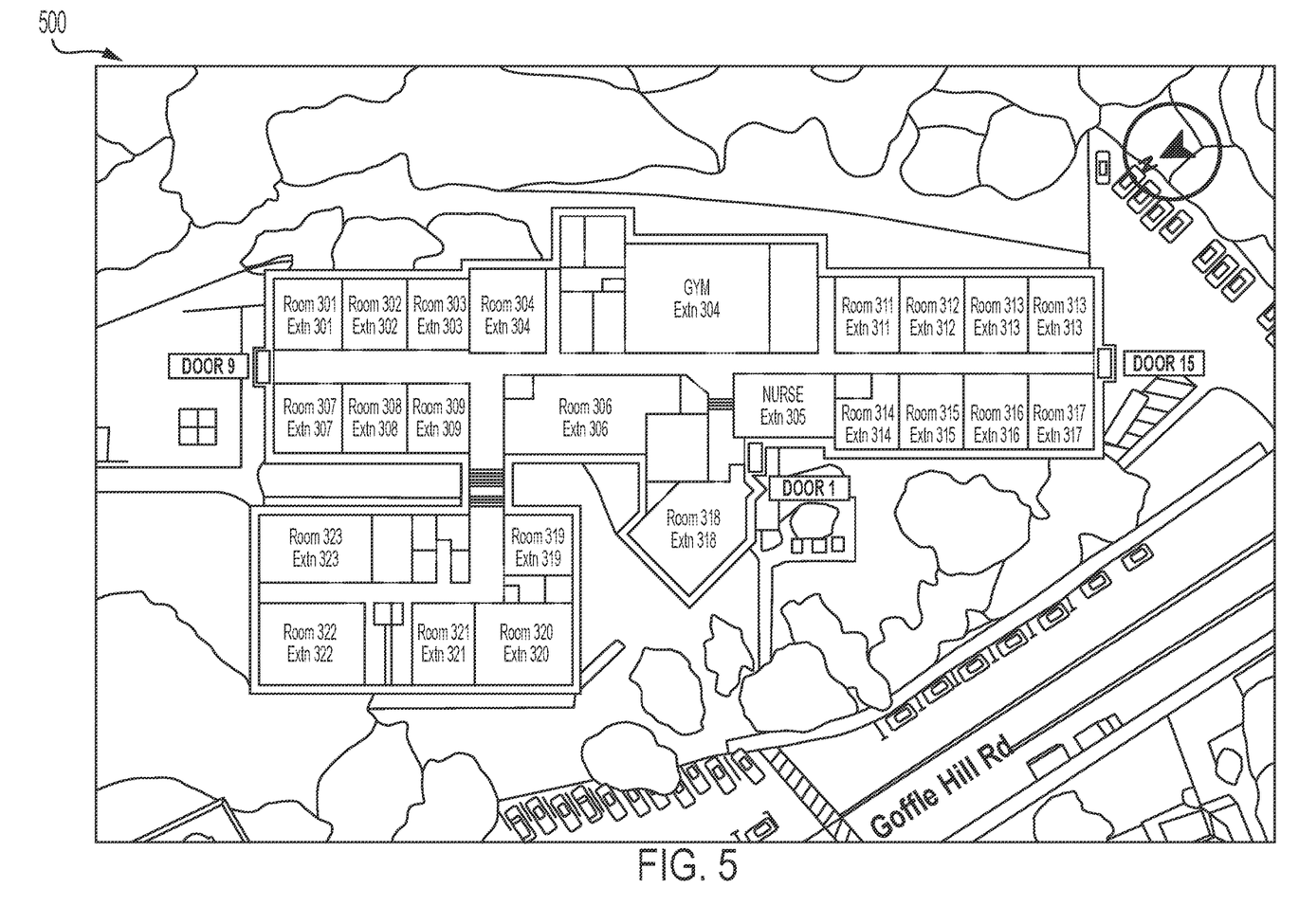
FIG. 5 is an example screenshot of enhanced geo spatial physical location information that can be characterized and stored in the location database in accordance with embodiments of the present invention.

An example of how the components of FIG. 2 interact can be seen in FIG. 3 and FIG. 4. FIG. 3 is a high-level methodology 300 for providing enhanced geospatial location data for emergency services calls originating from one or more phone extensions, device IDs, or user IDs using voice over internet protocol (VoIP) or MLTS multi-line telephone system. FIG. 4 is the methodology for maintaining the location database such that location data is current, accurate, and in compliance with law and regulations.

Referring now to the method 300 of FIG. 3, at the heart of the invention is the maintaining of the location database 202 (Step 302). The method then proceeds when a request for location data for an emergency services call from a phone extension, device ID, or user ID 204 stored in the database 202 is received (Step 304). The geospatial location data associated with the phone extension, device ID, or user ID 204 stored in the maintained database for the emergency services call is then output in response to the request (Step 306). Each of these steps will be discussed in more detail below.

FIG. 4 is the methodology for maintaining the location database 202 such that location data is current, accurate, and in compliance with law and regulations as set forth in Step 302 of FIG. 3.

The first step as set forth in FIG. 4 is providing the location database 202 (Step 402). As set forth previously, the location database 202 stores the one or more phone extensions, device IDs, or user IDs 204 wherein each phone extension, device IDs, or user IDs 204 is associated with a user 206 and a geospatial location. In certain embodiments, the database further includes contact information (cell phone number(s), email address) for the user 206 associated with each phone extension, device ID, or user ID 204. In some such embodiments, the contact information further includes an indication of a preferred contact method for the user 206.

The geospatial location can include one or more of a country indication, a state indication, a street address, a floor designation, a room designation, and a floorplan indication. An example of such a floorplan 500 can be seen in FIG. 5. Here an example screenshot is depicted. It should be noted that the text and icons presented in this floorplan 500 are merely illustrative of what can be displayed. The actual format and text can vary, thus the specific characters displayed in the screenshots are not directly relevant to the understanding of the invention. In certain embodiments, an elevation or altitude can be provided where a positive altitude is above sea-level and a negative altitude is below sea-level. Altitude may be relayed to users of the system by correlating floor or other appropriate indicator.

The next step of maintaining the database 202 (Step 302) as set in FIG. 4 is detecting a phone registration event (Step 404). In operation, when an extension, device ID, or user ID 204 is installed, moved, or otherwise reconnected it is logged as a registration event 224. In some embodiments, this can include detecting a connection of a phone associated with a phone extension 204 of the one or more phone extensions stored in the database 202 to a physical phone jack or line. In other embodiments, this includes detecting a change in a network/IP address associated with a phone extension, device ID, or user ID of the one or more phone extensions, device IDs, or user IDs stored in the database for a VoIP implementation. In certain embodiments, the registration event 224 is detected by a specialized server 225 provided by the 911 geospatial location service provider 212. In other embodiments, the registration event 224 is detected by other devices or systems in the data center 216. Once the phone extension registration event is detected, a notification 226 is sent to a user 206 associated with the phone extension in database 202 requesting geospatial location confirmation and/or clarification. (step 406).

With the prevalence of the use of VoIP and other mobile communications or otherwise untethered communications, it cannot be assumed that the phone extension is physically located at the client site 214. The provided notification and confirmation system accounts for this reality.

The notification may be sent to the user 206 based on contact information and/or preferences stored in the database 202. For example, the notification is sent via email, application, text message an additional electronic device. In certain embodiments, requesting geospatial location confirmation and/or clarification comprises asking the user 206 to confirm or verify the location information stored in the database 202. In other embodiments, requesting geospatial location confirmation and/or clarification comprises asking the user 206 for their current location. In some such embodiments, the request for geospatial location confirmation and/or clarification includes a detected location for the user (based on a personal electronic device) or a physical phone extension connection (provided by the network and/or data center 216).

Figure 6:
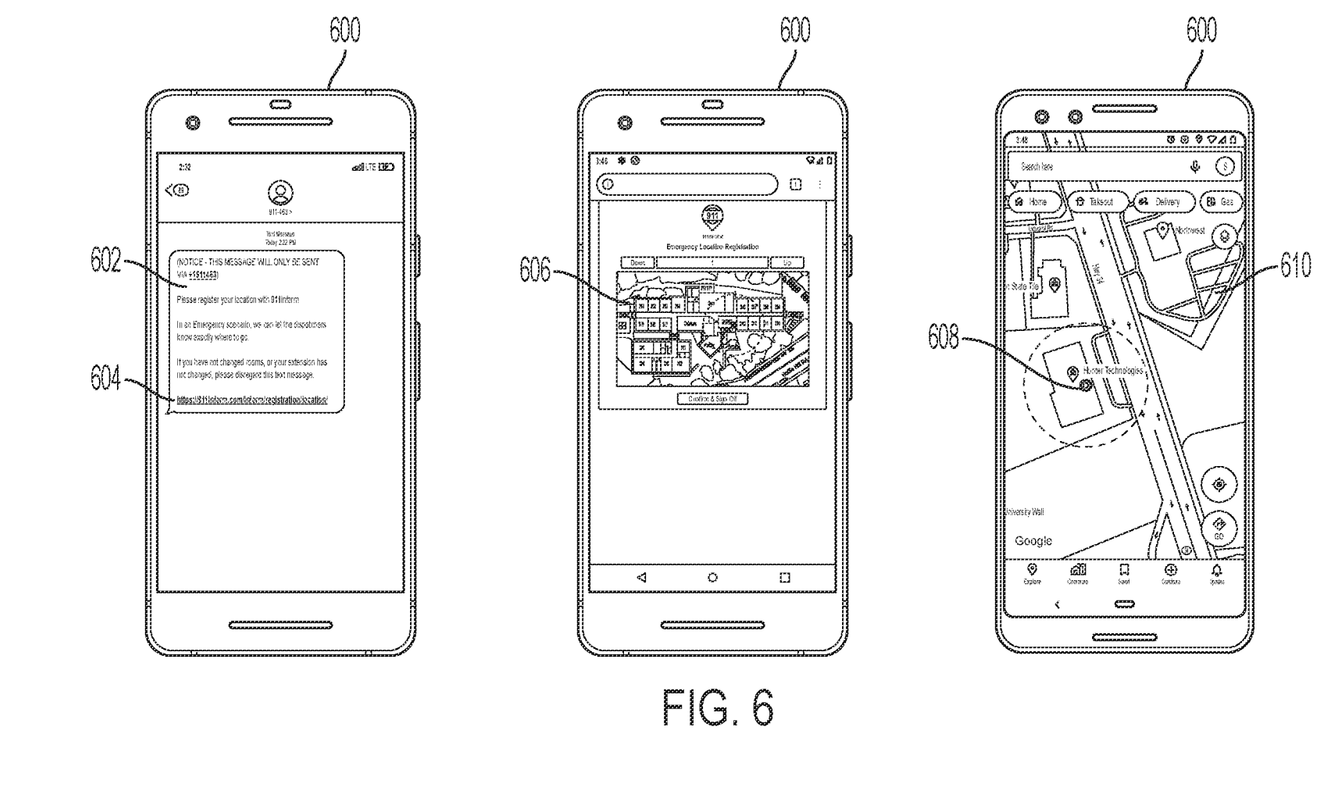
FIG. 6 depicts example screenshots of how the location database is updated using a user's cell phone in accordance with embodiments of the present invention.

FIG. 6 depicts an example notification and geospatial location confirmation performed using text messages from the user's mobile phone 600. Here several example screenshots are depicted. It should be noted that the text and icons presented in these screenshots are merely illustrative of what can be displayed. The actual format and text can vary, thus the specific characters displayed in the screenshots are not directly relevant to the understanding of the invention. In the leftmost image, a text message 602 requests the user 206 to confirm their address and provides a link 604. In this example, selecting the link 604 brings up a map 606, here a floorplan, as shown in the middle image, where the user 206 can specify their location within the map 606. In cases where the user is not in a site 214 or a floorplan is not available, the user's position 608 can be confirmed in a maps application 610 as seen in the rightmost image.

Figure 7:
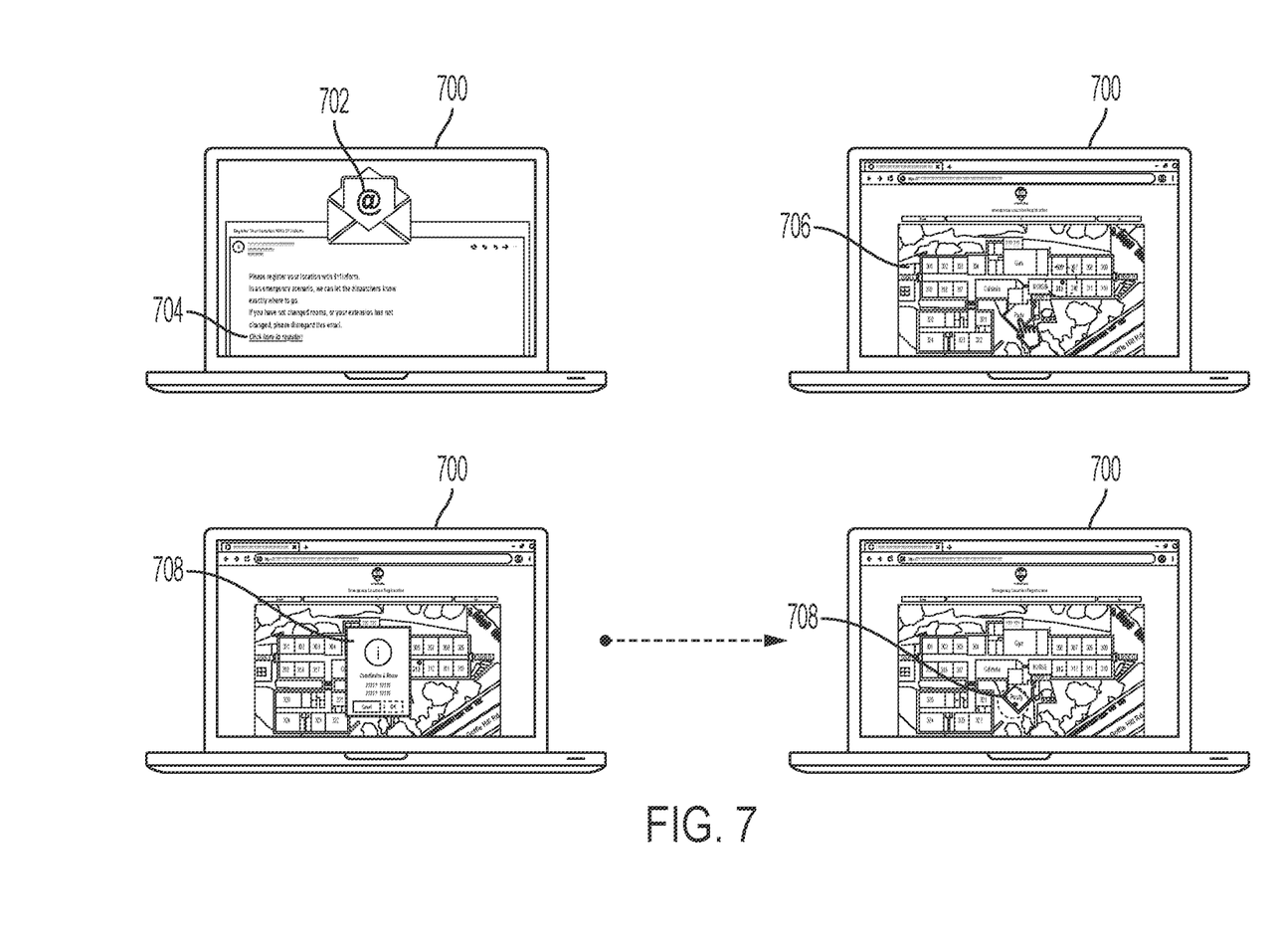
FIG. 7 depicts example screenshots of how the location database is updated using a user's personal computer in accordance with embodiments of the present invention.
Figure 8:
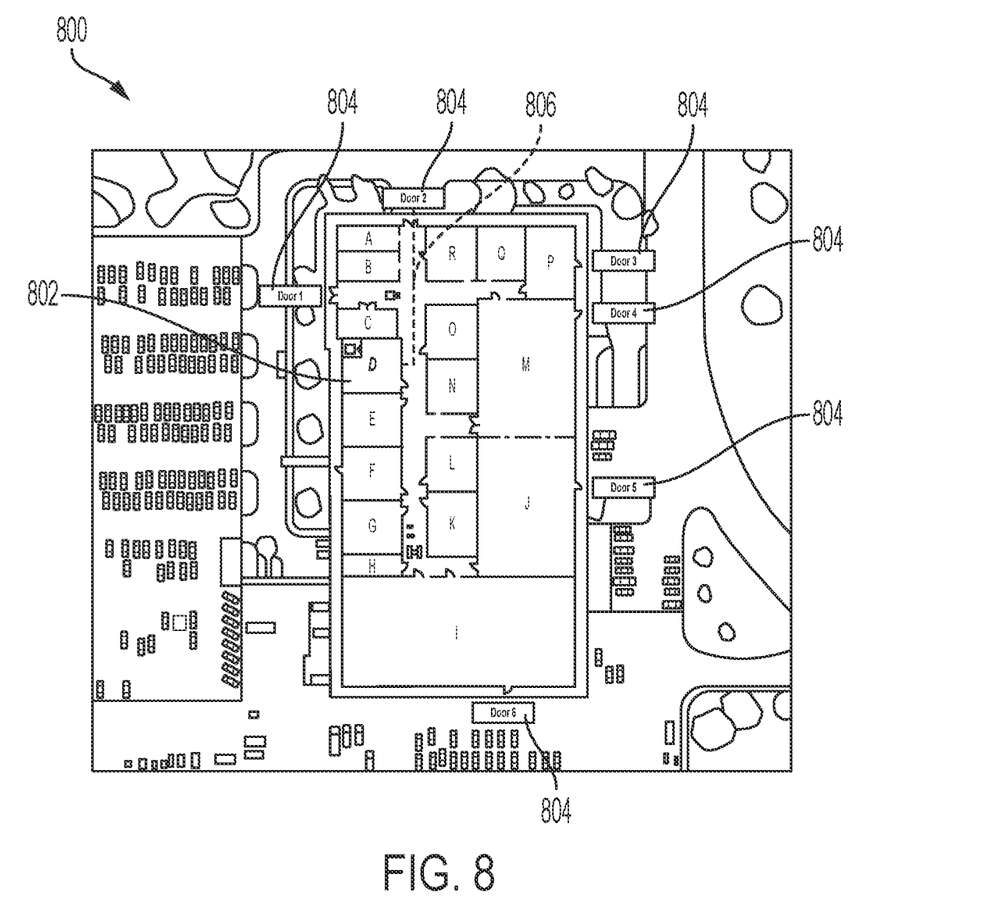
FIG. 8 is an example screenshot of an enhanced geospatial physical location that can be provided by the location database in accordance with embodiments of the present invention.

FIG. 7 depicts an example notification and confirmation process using email on the user's personal computer 700. Here several example screenshots are depicted. It should be noted that the text and icons presented in these screenshots are merely illustrative of what can be displayed. The actual format and text can vary, thus the specific characters displayed in the screenshots are not directly relevant to the understanding of the invention. In the upper left image, an email 702 requests the user 206 to confirm their address and provides a link 704. In this example, selecting the link 704 brings up a map 706, here a floorplan, as shown in the upper right image, where the user 206 can specify their location within the floorplan. In the bottom left image, the user sends their confirmed position 708 in a map 706. In the bottom right image, the user's confirmed location 708 is shown in an updated map 706.

The geospatial location confirmation received from the user 206 in response to the notification (Step 408) is then used to update the database 202 (step 410). In some embodiments, once the database has been updated (Step 410), the client representative 242 can be notified that all client sites 214 of the location service provider 212 are up to date and in compliance 228. In some embodiments, if geospatial location confirmation is not received the location service provider 212 may also issue a notification indicating lack of compliance.

Referring back to FIG. 2 and FIG. 3, with a maintained and updated database 202 (Step 302) the system 200 is then ready to process emergency services calls. Here when a 911 call is made by an extension, device ID, or user ID 204, the call is handled by the emergency services call routing service 208. If the call is made using a physical phone extension using PRI 230 or a VoIP extension using SIP 232 allotted to the client site 214, the system 200 handles the calls in the same manner. It should also be noted, that while the VoIP emergency services call using SIP 232 is shown coming from the client site 214, in actuality, the VoIP extension making the call could be located physically anywhere, and the system 200 would still account for the location of the user 206 making the call using the extension, device ID, or user ID 204.

When the emergency services call routing service 208 receives an emergency services call from an extension 204 (using PRI 230 or SIP 232) the 911-call routing service 911 requests 234 geospatial location data associated with the extension, device ID, or user ID 204 from the location service provider 212. When the location service provider 212 receives the request 234 for the location data (Step 304) the location service provider 212 consults the database 202 for the location data associated with the extension, device ID, or user ID 204 and outputs the location data 236 associated with the extension, device IDs, or user ID 204 (Step 306). The call 238 as well as the outputted location data 236 provided to the emergency services call routing service 208 can then be provided to the appropriate emergency responder 210.

The geospatial location data output by the location service provider 212 can include one or more of: a country indication, a state indication, a street address, a floor designation, a room designation, and a floorplan indication. An example of such a floorplan 800 can be seen in FIG. 8. Here an example screenshot is depicted. It should be noted that the text and icons presented in this floorplan are merely illustrative of what can be displayed. The actual format and text can vary, thus the specific characters displayed in the screenshots are not directly relevant to the understanding of the invention. In this embodiment, the floorplan 800 includes the location of the caller 802, indication of access points to the site 214 (Doors 804), and preferred path for access to or egress for the caller 806.

In certain embodiments, the location service provider 212 can provide additional functionality. For example, the location service provider can send notification 240 to security personal 242 at the location of the emergency services call.

Figure 9:
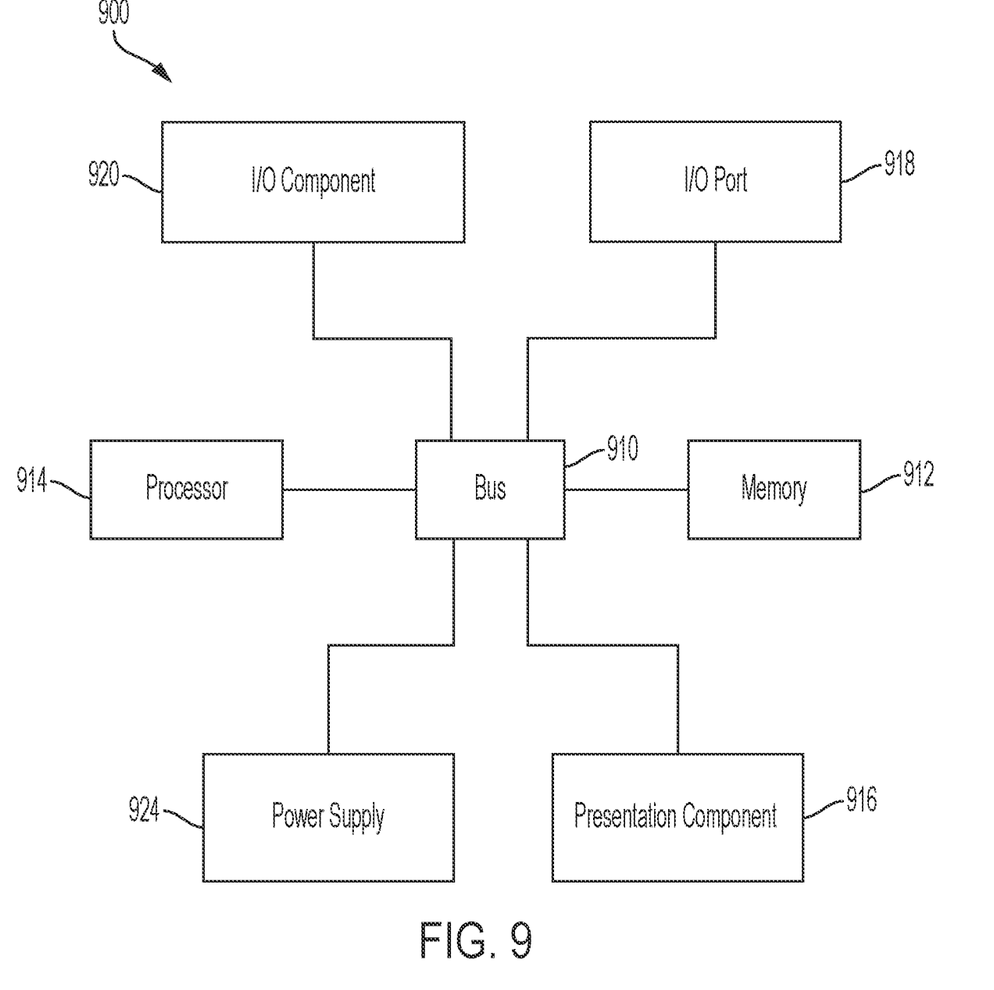
FIG. 9 is a diagrammatic illustration of a high-level architecture configured for implementing processes in accordance with aspects of the invention.

One illustrative example of a computing device 900 used to provide the functionality of the present invention, such as provided by the location database 202, location service provider 212, or mobile device 600, or personal computing device 700. The computing device 900 is merely an illustrative example of a suitable special-purpose computing environment and in no way limits the scope of the present invention. A "computing device," as represented by FIG. 9, can include a "workstation," a "server," a "laptop," a "desktop," a "hand-held device," a "mobile device," a "tablet computer," or other computing devices, as would be understood by those of skill in the art. Given that the computing device 900 is depicted for illustrative purposes, embodiments of the present invention may utilize any number of computing devices 900 in any number of different ways to implement a single embodiment of the present invention. Accordingly, embodiments of the present invention are not limited to a single computing device 900, as would be appreciated by one with skill in the art, nor are they limited to a single type of implementation or configuration of the example computing device 900.

The computing device 900 can include a bus 910 that can be coupled to one or more of the following illustrative components, directly or indirectly: a memory 912, one or more processors 914, one or more presentation components 916, input/output ports 918, input/output components 920, and a power supply 924. One of skill in the art will appreciate that the bus 910 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 9 is merely illustrative of an exemplary computing device that can be used to implement one or more embodiments of the present invention, and in no way limits the invention.

The computing device 900 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 900.

The memory 912 can include computer-storage media in the form of volatile and/or nonvolatile memory. The memory 912 may be removable, non-removable, or any combination thereof. Exemplary hardware devices are devices such as hard drives, solid-state memory, optical-disc drives, and the like. The computing device 900 can include one or more processors 914 that read data from components such as the memory 912, the various I/O components 916, etc. Presentation component(s) 916 present data indications to a user or other device. Exemplary presentation components include a display device, speaker, printing component, vibrating component, etc.

The I/O ports 918 can enable the computing device 900 to be logically coupled to other devices, such as I/O components 920. Some of the I/O components 920 can be built into the computing device 900. Examples of such I/O components 920 include a camera 9 microphones, joystick, recording device, game pad, satellite dish, scanner, printer, wireless device, networking device, and the like.

The power supply 924 can include batteries. Other suitable power supply or batteries will be apparent to one skilled in the art given the benefit of this disclosure.

The disclosed embodiments of the present invention provide an enhanced geospatial physical location for emergency services calls originating from one or more phone extensions using voice over internet protocol (VoIP) or MLTs multi-line telephone system. The system and method detect when a phone extension has been added or moved and queries the user associated with the extension to obtain the current location of the extension, device ID, or user ID. The obtained location data is maintained in a database which can then be queried or otherwise consulted to provide location data for an emergency services call from the phone extension, device ID, or user ID. Thus, the system provides a simple and elegant solution for maintaining compliance with laws and regulations that replaces a conventional and burdensome bookkeeping and reporting typically required of entities (or their IT departments) for compliance while providing enhanced functionality as the geospatial physical location data provided can be more robust and accurate than what was previously provided in conjunction with emergency services calls.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the term "extension(s)" are intended to include one or more of physical extension, virtual extension, device ID or user ID. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained.

The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for providing an enhanced geospatial physical location for use by emergency services calls originating from one or more phone extensions using voice over internet protocol (VoIP) or MLTS multi-line telephone system, the system comprising:
    an emergency call routing service configured to receive, process, and route emergency calls;
    a client having one or more phone extensions; and
    a geospatial location service provider in communication with the emergency call routing service and the client; the geospatial location service configured to:
        maintain a location database for the one or more phone extensions by:
            providing a database storing the one or more phone extensions wherein each phone extension is associated with the enhanced geospatial physical location and a user;
            detecting a phone extension registration event for a phone extension of the one or more phone extensions stored in the database;
            sending the user associated with the phone extension, for which the registration event was detected, a notification requesting geospatial location confirmation;
            receiving, in response to the sent notification, geospatial location confirmation from the user associated with the phone extension for which the location registration event was detected; and
            updating the database with the enhanced geospatial physical location received in the geospatial location confirmation;
        receive a request from the emergency call routing service for the enhanced geospatial physical location for an emergency services call from a phone extension stored in the maintained database; and
        output the enhanced geospatial physical location associated with the phone extension stored in the maintained database for the emergency services call in response to the request.

2. The system of claim 1, wherein the one or more phone extensions of the maintained database comprises one or more phone extensions associated with a site.

3. The system of claim 2, wherein the site comprises one or more of a company, organization, venue, building, campus, or facility.

4. The system of claim 2, wherein the one or more phone extensions of the maintained database corresponds to a physical phone jack/line.

5. The system of claim 2, wherein the maintained database is remote from the site with which the one or more phone extensions are associated.

6. The system of claim 1, wherein the enhanced geospatial physical location comprises one or more of: a country indication, a state indication, a street address, a floor designation, a room designation, and a floorplan indication.

7. The system of claim 1, wherein the database further includes contact information (cell phone number, email address, personal electronic device ID) for the user associated with each phone extension.

8. The system of claim 7, wherein the contact information further includes an indication of a preferred contact method for the user.

9. The system of claim 1, wherein detecting a phone extension registration event comprises detecting a connection of a phone associated with a phone extension of the one or more phone extensions stored in the database.

10. The system of claim 1, wherein detecting a phone extension registration event comprises detecting a change in a network/IP address associated with for a phone extension of the one or more phone extensions stored in the database.

11. The system of claim 1, wherein the notification is sent to the user via email.

12. The system of claim 1, wherein the notification is sent to the user via text message, additional electronic devices, or an application.

13. The system of claim 1, wherein requesting geospatial location confirmation comprises asking the user for their current physical location.

14. The system of claim 1, wherein requesting geospatial location confirmation comprises:
    providing enhanced geospatial location physical information based on location data obtained from sources other than the database; and
    requesting confirmation and/or clarification of provided geospatial location information.

15. The system of claim 14, wherein the enhanced geospatial physical location information is the location data provided from a personal electronic device of the user associated with the phone extension for which the registration event was detected.

16. The system of claim 14, wherein the enhanced geospatial physical location information is the location data provided by a network to which the phone extension, for which the registration event was detected, is connected.

17. The system of claim 1, wherein providing the enhanced geospatial physical location further includes providing a map of the geospatial location.

18. The system of claim 1, wherein outputting the enhanced geospatial physical location further comprises providing an altitude, where a positive altitude is above sea-level, and a negative altitude is below sea-level.

19. The system of claim 1, wherein outputting the enhanced geospatial physical location further comprises providing a room within a site where the phone extension for the emergency services call is located.

20. The system of claim 1, wherein maintaining location database, further comprises issuing a notification if a location confirmation is not received.

21. A system for providing an enhanced geospatial physical location for use by emergency services calls originating from one or more phone extensions using voice over internet protocol (VoIP) or MLTS multi-line telephone system, the system comprising:
- a server configured to:
  - maintain a location database for the one or more phone extensions by:
    - providing a database storing the one or more phone extensions wherein each phone extension is associated with the enhanced geospatial physical location and a user;
    - detecting a phone extension registration event for a phone extension of the one or more phone extensions stored in the database;
    - sending the user associated with the phone extension, for which the registration event was detected, a notification requesting geospatial location confirmation;
    - receiving, in response to the sent notification, geospatial location confirmation from the user associated with the phone extension for which the location registration event was detected; and
    - updating the database with the enhanced geospatial physical location received in the geospatial location confirmation;
  - receive a request for the enhanced geospatial physical location for an emergency services call from a phone extension stored in the maintained database; and
  - output the enhanced geospatial physical location associated with the phone extension stored in the maintained database for the emergency services call in response to the request.

22. A system for providing an enhanced geospatial physical location for use by emergency services calls originating from one or more phone extensions using voice over internet protocol (VoIP) or MLTS multi-line telephone system, the system comprising:
- an emergency call routing service configured to receive, process, and route emergency calls; and
- a geospatial location service provider in communication with the emergency call routing service; the geospatial location service configured to:
  - maintain a location database for the one or more phone extensions by:
    - providing a database storing the one or more phone extensions wherein each phone extension is associated with the enhanced geospatial physical location and a user;
    - detecting a phone extension registration event for a phone extension of the one or more phone extensions stored in the database;
    - sending the user associated with the phone extension, for which the registration event was detected, a notification requesting geospatial location confirmation;
    - receiving, in response to the sent notification, geospatial location confirmation from the user associated with the phone extension for which the location registration event was detected; and
    - updating the database with the enhanced geospatial physical location received in the geospatial location confirmation;
  - receive a request from the emergency call routing service for the enhanced geospatial physical location for an emergency services call from a phone extension stored in the maintained database; and
  - output the enhanced geospatial physical location associated with the phone extension stored in the maintained database for the emergency services call in response to the request.

23. A method of providing an enhanced geospatial physical location for use by emergency services calls originating from one or more phone extensions using voice over internet protocol (VoIP) or MLTS multi-line telephone system, the method comprising:
- maintaining a location database for the one or more phone extensions by:
  - providing a database storing the one or more phone extensions wherein each phone extension is associated with the enhanced geospatial physical location and a user;
  - detecting a phone extension registration event for a phone extension of the one or more phone extensions stored in the database;
  - sending the user associated with the phone extension, for which the registration event was detected, a notification requesting geospatial location confirmation;
  - receiving, in response to the sent notification, geospatial location confirmation from the user associated with the phone extension for which the location registration event was detected; and
  - updating the database with the enhanced geospatial physical location received in the geospatial location confirmation;
- receiving a request for the enhanced geospatial physical location for an emergency services call from a phone extension stored in the maintained database; and
- outputting the enhanced geospatial physical location associated with the phone extension stored in the maintained database for the emergency services call in response to the request.

24. The method of claim 23, wherein the one or more phone extensions of the maintained database comprises one or more phone extensions associated with a site.

25. The method of claim 24, wherein the one or more phone extensions of the maintained database corresponds to a physical phone jack/line.

26. The method of claim 25, wherein the maintained database is remote from the site with which the one or more phone extensions are associated.

27. The method of claim 23, wherein the enhanced geospatial physical location comprises one or more of: a country indication, a state indication, a street address, a floor designation, a room designation, and a floorplan indication.

28. The method of claim 23, wherein the database further includes contact information (cell phone number, personal electronic device ID) for the user associated with each phone extension.

29. The method of claim 28, wherein the contact information further includes an indication of a preferred contact method for the user.

30. The method of claim 23, wherein detecting a phone extension registration event comprises detecting a connection of a phone associated with a phone extension of the one or more phone extensions stored in the database.

31. The method of claim 23, wherein detecting a phone extension registration event comprises detecting a change in a network/IP address associated with for a phone extension of the one or more phone extensions stored in the database.

32. The method of claim 23, wherein the notification is sent to the user via email.

33. The method of claim 23, wherein the notification is sent to the user via text message, additional electronic devices, or an application.

34. The method of claim 23, wherein requesting geospatial location confirmation comprises asking the user for their current physical location.

35. The method of claim 23, wherein requesting geospatial location confirmation comprises:
providing enhanced geospatial location physical information based on location data obtained from sources other than the database; and
requesting confirmation and/or clarification of provided geospatial location information.

36. The method of claim 35, wherein the enhanced geospatial physical location information is the location data provided from a personal electronic device of the user associated with the phone extension for which the registration event was detected.

37. The method of claim 35, wherein the enhanced geospatial physical location information is the location data provided by a network to which the phone extension, for which the registration event was detected, is connected.

38. The method of claim 23, wherein providing the enhanced geospatial physical location further includes providing a map of the geospatial location.

39. The method of claim 23, wherein outputting the enhanced geospatial physical location further comprises providing an altitude, where a positive altitude is above sea-level, and a negative altitude is below sea-level.

40. The method of claim 23, wherein outputting the enhanced geospatial physical location further comprises providing a room within a site where the phone extension for the emergency services call is located.

41. The method of claim 40, wherein the site comprises one or more of a company, organization, venue, building, campus, or facility.

42. The method of claim 23, wherein maintaining location database, further comprises issuing a notification if a location confirmation is not received.

* * * * *